(12) United States Patent
Khawer et al.

(10) Patent No.: US 9,769,836 B2
(45) Date of Patent: Sep. 19, 2017

(54) USER EQUIPMENT ASSISTANCE FOR INTERFERENCE MITIGATION IN UNLICENSED FREQUENCY BANDS

(71) Applicant: Alcatel-Lucent USA Inc., Murray Hill, NJ (US)

(72) Inventors: Mohammad R. Khawer, Lake Hopatcong, NJ (US); Jonathan Ling, North Brunswick, NJ (US); Teck H. Hu, Melbourne, FL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/476,052

(22) Filed: Sep. 3, 2014

(65) Prior Publication Data
US 2016/0066204 A1   Mar. 3, 2016

(51) Int. Cl.
*H04B 7/00* (2006.01)
*H04W 72/08* (2009.01)
*H04W 72/04* (2009.01)

(52) U.S. Cl.
CPC ........ *H04W 72/085* (2013.01); *H04W 72/042* (2013.01)

(58) Field of Classification Search
CPC .............................. H04W 16/14; H04W 17/00
USPC ........................................................ 455/500
See application file for complete search history.

(56) References Cited

U.S. PATENT DOCUMENTS

| | | | |
|---|---|---|---|
| 2008/0014918 A1* | 1/2008 | Ito ........................ | H04B 17/318 455/423 |
| 2009/0111463 A1* | 4/2009 | Simms ................... | H04W 16/14 455/424 |
| 2010/0157910 A1* | 6/2010 | Nentwig ............... | H04L 5/0007 370/329 |
| 2010/0202391 A1 | 8/2010 | Palanki | |
| 2011/0103291 A1 | 5/2011 | Wiberg | |
| 2015/0056931 A1* | 2/2015 | Yerramalli ............. | H04B 17/00 455/67.13 |

(Continued)

FOREIGN PATENT DOCUMENTS

WO    2014035415    3/2014

OTHER PUBLICATIONS

Non-Final Office Action mailed Feb. 7, 2017 for U.S. Appl. No. 14/476,029, 159 pages.

(Continued)

*Primary Examiner* — Wesley Kim
*Assistant Examiner* — Raj Chakraborty
(74) *Attorney, Agent, or Firm* — Davidson Sheehan LLP

(57) ABSTRACT

A first base station selects a subset of channels of an unlicensed frequency band based on indications of energy received over the channels. The first base station transmits one or more messages instructing user equipment to monitor the subset of channels and report information indicating whether at least one second base station is transmitting over the subset of channels. User equipment monitors the subset of channels of the unlicensed frequency band in response to receiving the one or more messages from a first base station indicating the subset of channels. The user equipment transmits one or more messages including information indicating whether one or more second base stations are transmitting over the subset of channels.

22 Claims, 8 Drawing Sheets

(56) References Cited

U.S. PATENT DOCUMENTS

2015/0063323 A1* 3/2015 Sadek .............. H04W 72/1215
                                                    370/336
2015/0146680 A1    5/2015  Luo
2015/0245411 A1    8/2015  Damnjanovic
2015/0341921 A1    11/2015 Chen

OTHER PUBLICATIONS

IEEE Std 802.11-2012 "IEEE Standard for Information technology—Telecommunications and information exchange between systems—Local and metropolitan area networks, Part 11: Wireless LAN Medium Access Control (MAC) and Physical Layer (PHY) Specifications", Section 10.11, 27 pages.
U.S. Appl. No. 14/476,029, filed Sep. 3, 2014, listing Mohammad R. Khawer et al. as inventor(s), entitled "Interface for Interference Mitigation in Unlicensed Frequency Bands".
Final Office Action mailed Oct. 6, 2016 for U.S. Appl. No. 14/476,029, 83 pages.
Advisory Action mailed Nov. 11, 2016, for U.S. Appl. No. 14/476,029, 4 pages.

* cited by examiner

USER EQUIPMENT ASSISTANCE FOR INTERFERENCE MITIGATION IN UNLICENSED FREQUENCY BANDS

CROSS REFERENCE TO RELATED APPLICATIONS

This application is related to U.S. patent application Ser. No. 14/476,029, entitled "INTERFACE FOR INTERFERENCE MITIGATION IN UNLICENSED FREQUENCY BANDS" and filed on even date herewith, the entirety of which is incorporated by reference herein.

BACKGROUND

Field of the Disclosure

The present disclosure relates generally to wireless communication systems and, more particularly, to unlicensed frequency bands in wireless communication systems.

Description of the Related Art

Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider. Wireless communication devices that transmit or receive signals in licensed or unlicensed frequency bands are typically referred to as nodes, which may include Wi-Fi access points that operate according to IEEE 802.11 standards in the unlicensed spectrum or base stations that operate in licensed spectrum according to standards such as Long Term Evolution (LTE) standards defined by the Third Generation Partnership Project (3GPP). Base stations that operate according to LTE may also implement supplementary downlink (SDL) channels in the unlicensed spectrum to provide additional bandwidth for downlink communications to user equipment that are also communicating with the base station using channels in a licensed frequency band.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for user equipment-assisted interference mitigation in unlicensed frequency bands of a wireless communication system. The method includes selecting, at a first base station, a subset of channels of an unlicensed frequency band based on indications of energy received over the channels. The method also includes transmitting, from the first base station, one or more messages instructing user equipment to monitor the subset of channels and report information indicating whether one or more second base stations are transmitting over the subset of channels.

In some embodiments, a method is provided for assisting interference mitigation in unlicensed frequency bands of a wireless communication system. The method includes monitoring, at user equipment, a subset of channels of an unlicensed frequency band in response to receiving at least one message from a first base station indicating the subset of channels. The method also includes transmitting, from the user equipment, one or more messages including information indicating whether one or more second base stations are transmitting over the subset of channels In some embodiments, a base station is provided for user equipment-assisted interference mitigation in unlicensed frequency bands of a wireless communication system. The base station includes a processor to select a subset of channels of an unlicensed frequency band based on indications of energy received over the channels. The base station also includes a transceiver to transmit one or more messages instructing user equipment to monitor the subset of channels and report information indicating whether one or more second base stations are transmitting over the subset of channels.

In some embodiments, user equipment is provided for assisting interference mitigation in unlicensed frequency bands of a wireless communication system. The user equipment includes a processor to monitor a subset of channels of an unlicensed frequency band in response to receiving at least one message from a first base station indicating the subset of channels. The user equipment also includes a transceiver to transmit one or more messages including information indicating whether one or more base stations are transmitting over the subset of channels.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
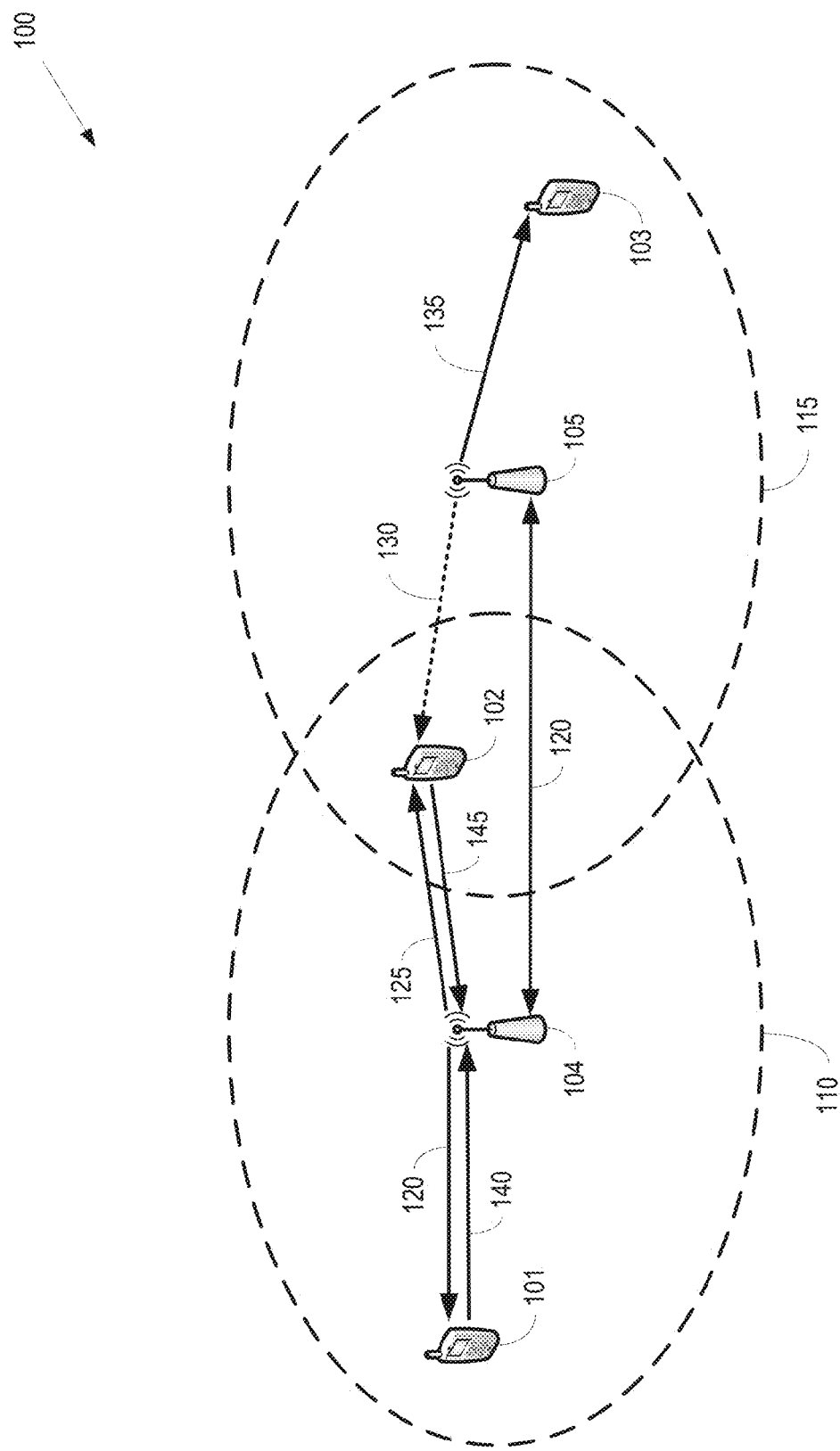
FIG. 1 is a diagram of a first example of a wireless communication system according to some embodiments.

Base stations perform carrier sensing to select channels for downlink transmission in unlicensed frequency bands. For example, a base station may measure energy received in channels in the unlicensed frequency bands to identify a "clean" channel, e.g., an average of the received energy from other LTE base stations or Wi-Fi access points on the channel is below a threshold value. The base station may then use the clean channel for downlink transmissions. If the base station is unable to identify a clean channel, the base station has to share the channel with one or more other transmitting nodes. The channels that are available for sharing may be limited by constraints imposed by different radio access technologies (RATs). For example, Wi-Fi access points use a primary channel and a secondary channel to communicate with receiving nodes. The primary channel carries a beacon signal that conveys system information to the receiving nodes. The receiving nodes may not be able to successfully receive (i.e., demodulate and decode) the primary channel if there is interference from downlink transmissions on the primary channel by an LTE base station. Failure to receive the beacon signal on the primary channel may cause the receiving nodes to lose their association with the Wi-Fi access point. Consequently, LTE base stations should not select the primary channel of a Wi-Fi access point for downlink transmissions. However, LTE base stations do not typically include functionality that allows them to identify primary or secondary channels of a Wi-Fi access point using signals received from the Wi-Fi access point over the primary or secondary channels.

Channel sharing may be further complicated by the fact that nodes such as Wi-Fi access points and LTE base stations are prone to a "hidden node problem." If two nodes are within range of the user equipment, but are too far apart to be aware of each other, the two nodes are "hidden" from each other. Nodes that are hidden from each other cannot coordinate transmission and reception of packets, e.g., to force time-sharing between the two nodes or to prevent one node from transmitting on the primary channel of another node. Packets transmitted by nodes that are hidden from each other may therefore collide at a receiving node, which can only decode one packet at a time. Consequently, packets intended for the receiving node may be missed or lost if they collide with other packets transmitted by a hidden node. For example, two or more base stations transmitting over the same channel in the unlicensed frequency band using their respective LTE supplementary downlink channel may interfere with each other if they use the same on/off pattern to avoid interference with one or more Wi-Fi access points during the gating cycle. For another example, LTE base stations may cause nodes to lose their association with a hidden Wi-Fi access point if the LTE base station chooses a primary channel of the hidden Wi-Fi access point for downlink transmission.

Interference between nodes that are hidden from each other may be reduced by instructing user equipment to monitor a subset of channels of an unlicensed frequency band and report information indicating whether one or more nodes are transmitting over the subset of channels. The subset of channels may be selected based on measurements of energy received by a first node over the channels of the unlicensed frequency band. For example, the first node may rank the channels so that the highest ranked channels correspond to lower measured values of received energy (which indicates a lower probability that another node is transmitting on the channel) and the lowest ranked channels correspond to higher measured values of received energy (which indicates a higher probability that another node is transmitting on the channel). The first node may then instruct the user equipment to monitor a subset that includes the highest ranked channels of the unlicensed frequency band, e.g., during a measurement gap. Some embodiments of the user equipment may report channel activity information for the subset of the channels and the first node may use the reported channel activity information to select one or more channels from the subset for downlink transmissions. Some embodiments of the user equipment may identify channels used by nodes that operate according to different RATs (such as primary and secondary channels used by Wi-Fi access points), or by another hidden LTE-U base station, so that the first node can bypass downlink transmissions on one or more of the identified channels. Some embodiments of the first node may also use the information reported by the user equipment to negotiate time-sharing of the channel with other nodes, e.g., using messages exchanged over a backhaul interface.

FIG. 1 is a diagram of a first example of a wireless communication system 100 according to some embodiments. The wireless communication system 100 includes a plurality of wireless communication nodes 101, 102, 103, 104, 105 (collectively referred to herein as "the nodes 101-105"). Embodiments of the nodes 101-103 may be wireless transceivers such as user equipment, mobile units, mobile terminals, stations, access terminals, and the like. In the interest of clarity, the nodes 101-103 are referred to herein as user equipment 101-103. Embodiments of the nodes 104, 105 may be devices for providing wireless connectivity within corresponding geographic areas that are conventionally referred to as cells 110, 115. The nodes 104, 105 may also be referred to as base stations, eNodeBs, access points, access serving networks, macrocells, microcells, metrocells, femtocells, picocells, and the like. In the interest of clarity, the nodes 104, 105 are referred to herein as the base stations 104, 105. The base stations 104, 105 may transmit signals over a downlink (or forward link) to the user equipment 101-103. The user equipment 101-103 may transmit signals over an uplink (or reverse link) to the base stations 104, 105.

The user equipment 101-103 and the base stations 104, 105 may be configured to communicate over an air interface in licensed frequency bands or unlicensed frequency bands. As used herein, the phrase "unlicensed frequency band" will be understood to refer to a portion of the radiofrequency spectrum that does not require a license for use and may therefore be used by any of the user equipment 101-103 or the base stations 104, 105 to transmit or receive radiofrequency signals. For example, the Unlicensed National Information Infrastructure (UNII) includes portions of the radio spectrum in frequency bands that range from 5.15 GHz to 5.825 GHz. For another example, the industrial, scientific, and medical (ISM) radio bands are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. As used herein, the phrase "licensed frequency band" will be understood to refer to a portion of the radiofrequency spectrum that is licensed to a particular service provider or providers and may only be used for wireless communication by the user equipment 101-103 or the base stations 104, 105 that are authorized by the service provider. For example, the United States Federal Communication Commission (FCC) licenses the frequency bands 698-704 MHz and 728-734 MHz to Verizon Wireless and the frequency bands 710-716 MHz and 740-746 MHz to AT&T.

The unlicensed frequency bands support a plurality of channels that may be used for downlink transmissions from the base stations 104, 105 to the user equipment 101-103. For example, the 5 GHz unlicensed frequency band allocated to the UNII may be divided into a predetermined number of 20 MHz channels. Some embodiments of the base stations 104, 105 may use the channels in the unlicensed frequency band to support local area wireless radio access technologies (RATs) such as Wi-Fi or other communications according to the Institute of Electrical and Electronics Engineers (IEEE) 802.11 standards. Some embodiments of the base stations 104, 105 may use the channels in the unlicensed frequency band to supplement downlink transmissions over channels of a licensed frequency band. For example, a base station that operates according to LTE may transmit best effort data on a supplemental downlink channel in the unlicensed frequency band concurrently with transmitting data, control information, or other critical information on a channel of the licensed frequency band.

The base stations 104, 105 may use a channel selection algorithm to choose one or more of the unlicensed frequency band channels for downlink transmission. Some embodiments of the base stations 104, 105 may select unlicensed channels based on measurements of energy received over one or more of the channels for a predetermined time interval (e.g., long-term energy detection), detection of preambles such as Wi-Fi preambles received over the channels, detection of overhead broadcast channels from neighboring nodes, and the like. However, the base stations 104, 105 may not be able to detect each other over the air interface. For example, the base station 104 is not encompassed by the boundary of the cell 115 and the base station 105 is not encompassed by the boundary of the cell 110. Consequently, the base stations 104, 105 may not be able to detect each other's downlink transmissions on channels of unlicensed frequency bands. The base stations 104, 105 are therefore "hidden" from each other.

User equipment 101-103 may assist the base stations 104, 105 by informing the base stations 104, 105 of interfering downlink transmissions on channels of the unlicensed frequency bands. The user equipment 101-103 may monitor channels of the unlicensed frequency bands based on information received from one or more of the base stations 104, 105. For example, the base station 104 may measure signal strengths for transmissions received on a set of channels of the unlicensed frequency band and rank the channels based on the measured signal strength. The base station 104 may then select a subset of the channels as candidates for downlink transmissions, with channels having the lowest measured signal strengths getting the highest ranking. The number of channels in the subset may range from a single channel to the number of channels in the unlicensed frequency band.

The base station 104 may transmit one or more messages 120, 125 to instruct the user equipment 101, 102 to measure one or more indicators of downlink transmissions on the subset of channels of the unlicensed frequency band. For example, the base station 104 may transmit messages 120, 125 that include information that can be used to configure the user equipment 101, 102 to monitor the indicators during a measurement gap. The user equipment 101, 102 temporarily suspend transmission or reception with the serving base station 104 to monitor signals from other nodes during the configured measurement. For example, the user equipment 102 may monitor an interfering downlink signal 130 produced when the base station 105 transmits a downlink signal 135 to the user equipment 103. The monitored signals can be used to measure indicators such as received energy, received signal strengths, signal-to-noise ratios (SNRs), signal-to-interference-plus-noise ratios (SINRs), and the like. The measured indicators may be used to determine whether other base stations are transmitting on the monitored subset of channels. For example, the user equipment 102 may detect the presence of the base station 105 if a received signal strength indicator (RSSI) associated with the downlink signal 130 on one of the subset of channels exceeds a threshold value. The user equipment 101 may monitor the requested subset of channels but may not detect the presence of other base stations. For example, the monitored RSSI for the subset of channels monitored by the user equipment 101 may be below the threshold value.

Some embodiments of the user equipment 101, 102 may demodulate or decode the monitored signals to determine characteristics of the channels. For example, if the base station 105 transmits the downlink signals 130, 135 on an unlicensed channel according to the Wi-Fi standards, the user equipment 101, 102 may use the demodulated or decoded signals 130, 135 to identify a primary channel used to transmit beacon signals or a secondary channel associated with the primary channel. Examples of primary channels include channels in the unlicensed frequency band that have a bandwidth of 20 MHZ or 40 MHZ channels, as defined according to 802.11n, and channels in the unlicensed frequency band that have a bandwidth of 40 MHZ, 80 MHZ or 160 MHZ, as defined according to 802.11ac. The primary and the secondary channels may be contiguous 20 MHZ channels, i.e. the secondary channel is either one before or one after the primary channel number. The primary and secondary channel association may be represented as (36, 1), in which case the primary channel is channel 36 and the secondary is channel 40, or (44, −1), in which case the primary channel is 44 and the secondary channel is 40. The user equipment 101, 102 may transmit one or more messages 140, 145 reporting the results of the measurements such as values of the indicators or information identifying the primary or secondary channels.

The base station 104 may select a clear channel if the messages 140, 145 received from the user equipment 101, 102 indicate that one or more of the channels in the subset is clear. As used herein, the term "clear" is understood to indicate that a measured value of an indicator of the presence of downlink transmissions in the unlicensed frequency band (such as a received signal strength indicator or other parameters discussed herein) is below a threshold value indicating that the unlicensed frequency band is clear of transmissions by other nodes and packets transmitted over a channel of the unlicensed frequency band are unlikely to collide with packets transmitted by other nodes. For example, the base station 104 may use a channel of the unlicensed frequency band for downlink transmissions if the user equipment 102 measures a received signal strength for the downlink transmissions 130 from the node 105 on the channel that is below a threshold value.

However, the base station 104 may have to share the channel with the hidden base station 105 if the message 145 received from the user equipment 102 indicates that the channels are not clear, e.g., due to interfering downlink transmissions 130 from the hidden base station 105. The base stations 104, 105 may therefore select or negotiate time intervals for downlink transmissions by the base stations 104, 105 over the shared channel of the unlicensed frequency band. Some embodiments of the base stations 104, 105 select a first portion of a gating cycle for transmission over a channel of the unlicensed frequency band in response to determining that the channel is clear of transmissions from other nodes and a second portion of the gating cycle that is time division multiplexed with the first portion in response to determining that the channel is shared with at least one other node. For example, the base station 105 may select the first half of the gating cycle if the base station 104 is not transmitting on a channel and the base station 104 may subsequently (e.g. in response to the message 145) select the second half of the gating cycle for transmission in response to determining that the base station 105 is already transmitting on the channel.

Some embodiments of the base stations 104, 105 may operate according to the same RAT and may be connected by an interface 120 such as a backhaul interface. One example of a backhaul interface is the X2 interface defined by the Third Generation Partnership Project (3GPP) standards, which may be used to connect LTE base stations 104, 105. The base stations 104, 105 may therefore exchange messages over the interface 120 to negotiate the time intervals that are used by the base stations 104, 105 for downlink transmissions. Although FIG. 1 depicts a single pair of base stations 104, 105 that are connected by the interface 120, some embodiments of the wireless communication system 100 may include larger numbers of base stations that are interconnected by additional interfaces that may be used to negotiate time intervals for sharing channels of the unlicensed frequency band. Furthermore, some embodiments of the base stations 104, 105 may operate according to different RATs and consequently may not be connected by an interface. For example, the base stations 104, 105 may not be connected by an interface if the base station 104 operates according to LTE and the base station 105 operates according to Wi-Fi.

Figure 2:
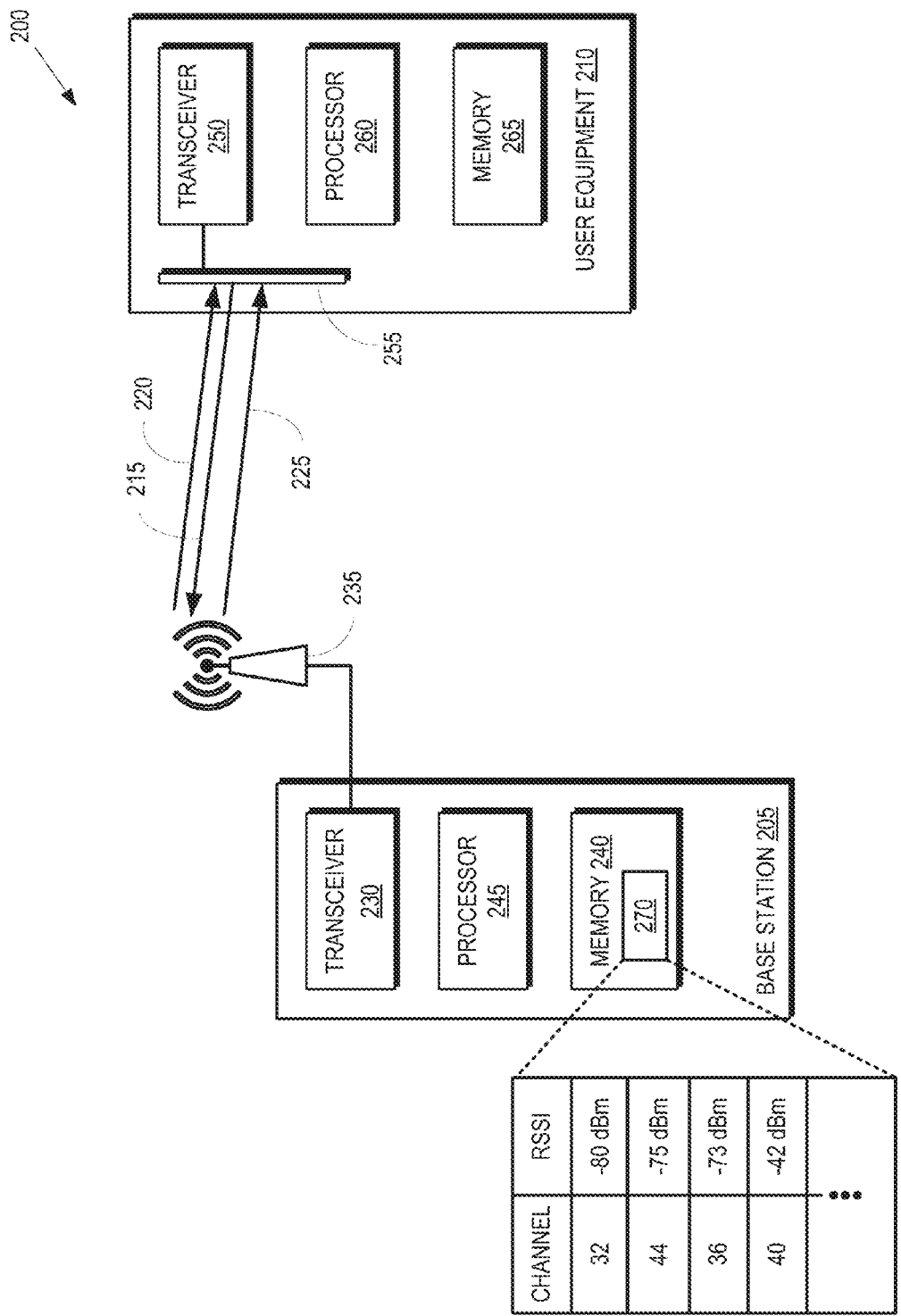
FIG. 2 is a diagram of a second example of a wireless communication system according to some embodiments.

FIG. 2 is a diagram of a second example of a wireless communication system 200 according to some embodiments. The wireless communication system 200 includes a base station 205 that may support wireless connectivity, e.g., to a node such as user equipment 210. Some embodiments of the base station 205 or the user equipment 210 may correspond to one or more of the user equipment 101-103 or the base stations 104, 105 shown in FIG. 1. The base station 205 and the user equipment 210 may communicate over one or more uplink channels 215 and one or more downlink channels 220 in a licensed frequency band. The base station 205 and the user equipment 210 may also communicate over a supplementary downlink channel 225 in an unlicensed frequency band.

The base station 205 includes a transceiver 230 that is coupled to an antenna 235. The transceiver 230 may transmit messages or signals over the downlink channels 220 in the licensed frequency band or the supplementary downlink channel 225 in the unlicensed band. The transceiver 230 may also receive signals over the uplink channels 215. The base station 205 includes memory 240 for storing information such as processor instructions, data for transmission, received data, and the like. A processor 245 may be used to process information for transmission, process received information, or perform other operations as discussed herein, e.g., by executing instructions stored in the memory 240.

The user equipment 210 includes a transceiver 250 that is coupled to an antenna 255. The transceiver 250 may transmit signals over the uplink channel 215 in the licensed frequency band. The transceiver 250 may receive signals over the downlink channel 220 in the licensed frequency band and the supplementary downlink channel 225 in the unlicensed frequency band. The user equipment 210 also includes a processor 260 and a memory 265. The processor 260 may be used to process information for transmission, process received information, or perform other operations as discussed herein, e.g., by executing instructions stored in the memory 265.

The processor 245 may be used to select subsets of carriers of the unlicensed frequency band for monitoring by the user equipment 210. For example, the transceiver 230 may provide measured values of a received signal strength indicator (RSSI) to the processor 245, which may use the measured values to generate a ranking 270 of the channels of the unlicensed frequency band. The ranking 270 may rank the channels so that the highest ranked channels have the lowest RSSI (which indicates the lowest probability that another base station is transmitting on the channel) and the lowest ranked channels have the highest RSSI (which indicates the highest probability that another base station is transmitting on the channel). The processor 245 may then select a subset of the highest ranked channels for monitoring by the user equipment 210. For example, the processor 245 may select channels 32 (−80 dBm), 44 (−75 dBm), and 36 (−72 dBm) and the processor 245 may not select channel 40 (−42 dBm) or any lower ranked channels that have higher measured values of the RSSI.

Some embodiments of the transceiver 230 may be used to transmit messages that include information indicating a candidate list of the subset of channels to be monitored by the user equipment 210 during a measurement gap. For example, the transceiver 230 may transmit a message including information indicating the selected channels 32, 44, and 36 over the downlink channel 220 of the licensed frequency band. The transceiver 230 may also be used to transmit messages including information for configuring the measurement gap used by the user equipment 210. Some embodiments of the message may include parameters such as a gap pattern identifier, a measurement gap length, a measurement gap repetition period, a minimum available time for measurements during a predetermined time interval, a purpose of the measurement, and the like.

Table 1 provides examples of gap configurations for different gap identifiers.

| Gap Pattern Id | Measurement Gap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, |

-continued

| Gap Pattern Id | Measurement Gap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 1 | 6 | 80 | 30 | LCR TDD, HRPD, CDMA2000 1x Inter-Frequency E-UTRAN FDD and TDD, UTRAN FDD, GERAN, LCR TDD, HRPD, CDMA2000 1x |
| 2 | TBD | TBD | TBD | IEEE 802.11 Beacon RSSI measurement. |

Messages that include the gap pattern ID 2 are used to configure the user equipment 210 to perform RSSI measurements of beacon signals transmitted according to IEEE 802.11, e.g., on channels of the unlicensed frequency band. The measurement gap length may be in the range 1-10 ms, the measurement gap repetition period may be in the range 10-100 ms, and the minimum available time may be in the range 10-100 ms. Some embodiments of the messages may also be used to configure the user equipment 210 to identify a primary channel or a secondary channel, such as a primary or secondary channel used by a Wi-Fi access point. For example, the user equipment 210 may be configured to demodulate or decode signals received over the channel during the configured measurement gap and use information in the demodulated or decoded signals such as a preamble transmitted in the beacon signal to identify the primary or secondary channel used by a Wi-Fi access point.

The transceiver 250 may receive (over the downlink channel 220) one or more messages requesting that the user equipment 210 monitor the subset of channels in the unlicensed frequency band. The one or more messages may also include gap configuration information, as discussed herein. The processor 260 may configure the user equipment 210 to perform measurements during the measurement gap indicated in the message. The transceiver 250 and the antenna 255 may be used to perform measurements of energy, RSSI, SNR, SINR, and the like for the subset of channels. The processor 260 may generate one or more messages including measurement reports based on the measurements and the transceiver 250 may report the results of monitoring the subset of channels by transmitting the messages over the uplink channel 215 of the licensed frequency band. For example, the transceiver 250 may use radio resource control (RRC) layer signaling to convey the monitoring results over the uplink channel 215.

Figure 3:
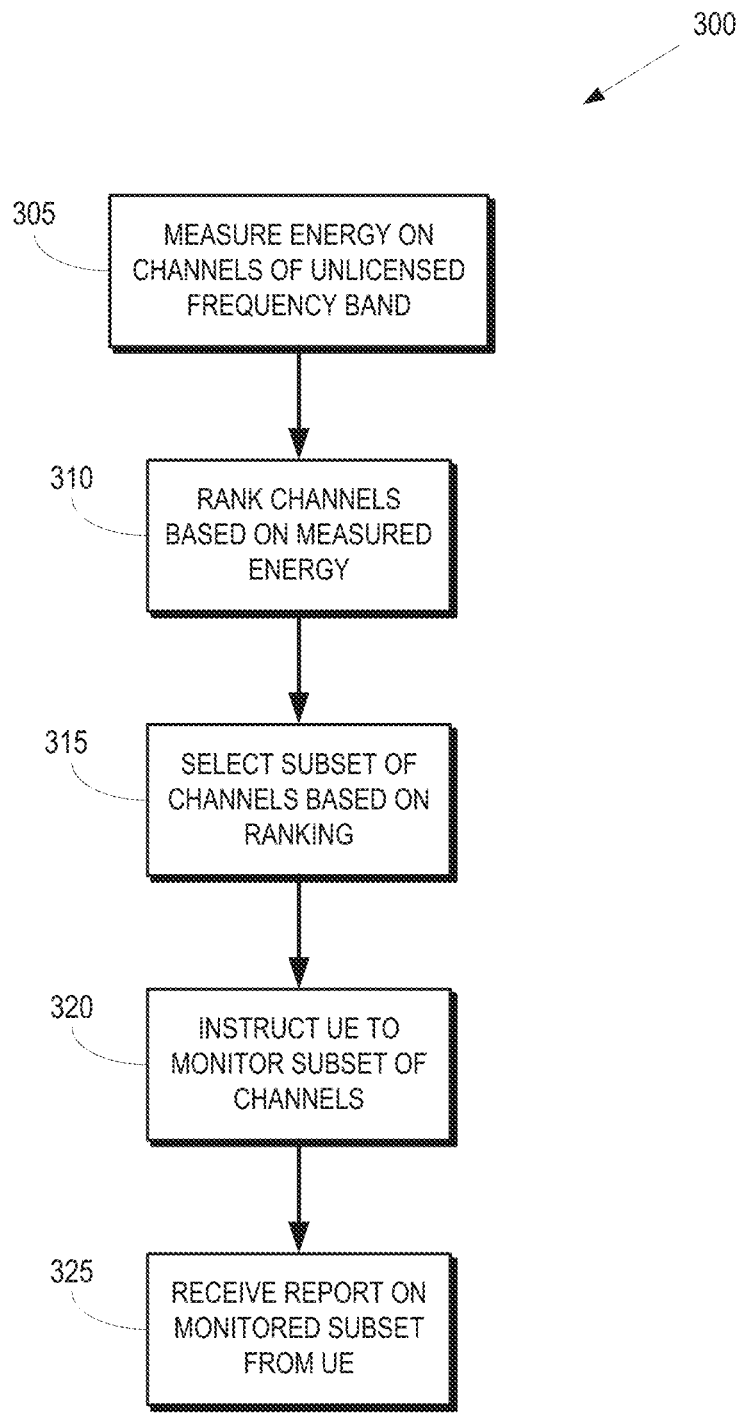
FIG. 3 is a flow diagram of a method of requesting and acquiring measurement reports from user equipment for a subset of channels of an unlicensed frequency band according to some embodiments.

FIG. 3 is a flow diagram of a method 300 of requesting and acquiring measurement reports from user equipment for a subset of channels of an unlicensed frequency band according to some embodiments. The method 300 may be implemented in some embodiments of the base stations 104, 105 shown in FIG. 1 and some embodiments of the base station 205 shown in FIG. 2. At block 305, a base station measures energy on one or more channels of an unlicensed frequency band. For example, the base station may measure the energies received over each of the channels during a predetermined time interval. At block 310, the base station ranks the channels based on the measured energies so that higher rankings indicate lower energies (and lower probabilities that another base station is transmitting on the channel) and lower rankings indicate higher energies (and higher probabilities that another base station is transmitting on the channel). At block 315, the base station selects a subset of the channels based on the rankings. For example, the base station may select a predetermined number (such as three) of the highest ranked channels.

At block 320, the base station instructs one or more user equipment to monitor the subset of channels of the unlicensed frequency band. Some embodiments of the base station may transmit a message including a candidate list that indicates the subset of channels. The base station may also transmit a message including information for configuring a measurement gap during which the user equipment can monitor the subset of channels. At block 325, the base station receives one or more messages from the user equipment including a report on the monitored subset of channels. The received messages may include information such as a measured RSSI, SNR, or SINR of one or more of the channels. The receive messages may also include information indicating whether one or more of the channels is a primary channel or a secondary channel, such as a primary or secondary channel of a Wi-Fi access point.

Figure 4:
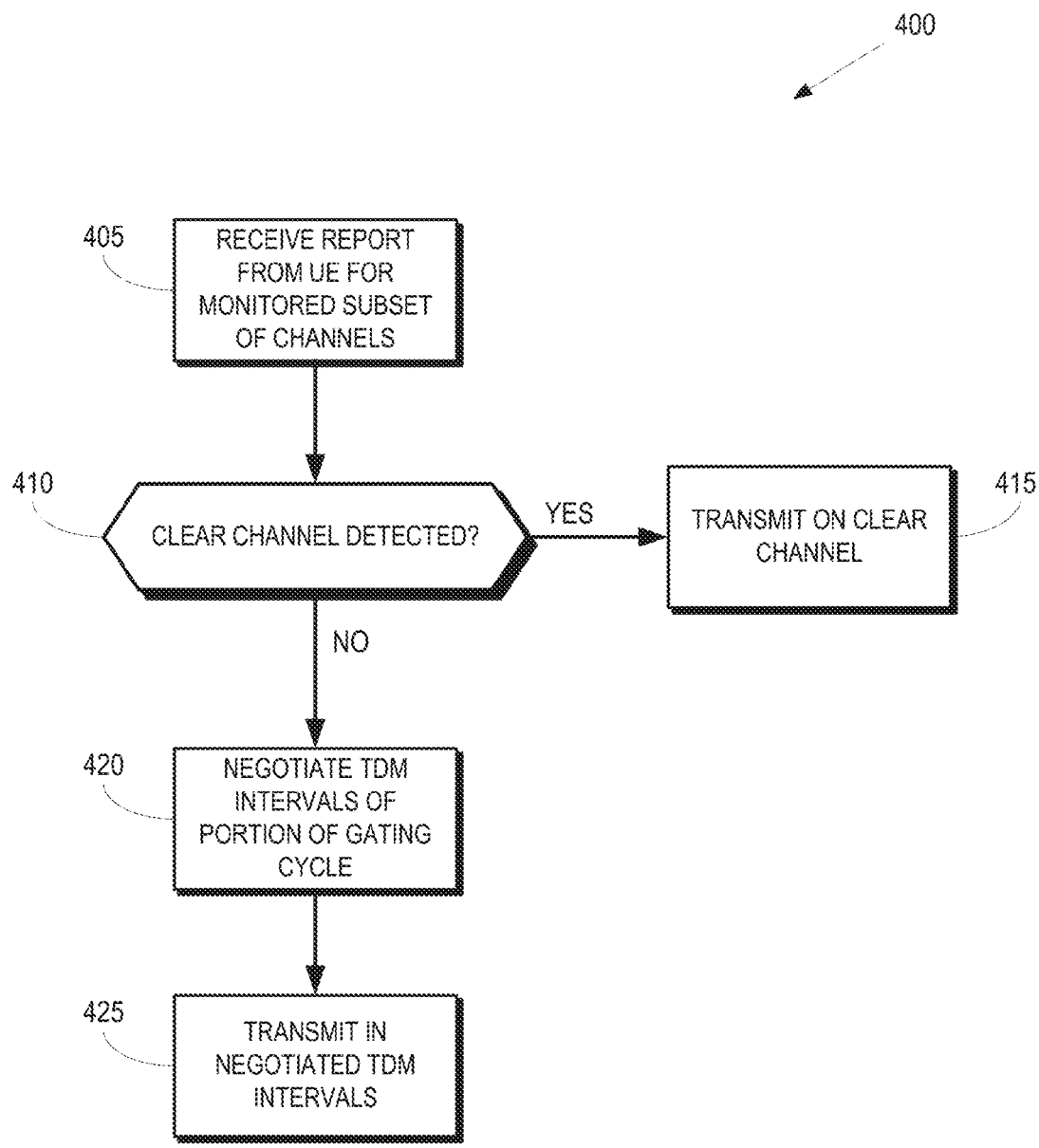
FIG. 4 is a flow diagram of a method for negotiating transmission time intervals of a shared channel of an unlicensed frequency band according to some embodiments.

FIG. 4 is a flow diagram of a method 400 for negotiating transmission time intervals of a shared channel of an unlicensed frequency band according to some embodiments. The method 400 may be implemented in some embodiments of the base stations 104, 105 shown in FIG. 1 and some embodiments of the base station 205 shown in FIG. 2. At block 405, the base station receives a report from one or more user equipment for a monitored subset of channels. In the illustrated embodiment, the base station receives one or more messages including the report, which may include information such as a measured RSSI, SNR, or SINR of one or more of the channels.

At decision block 410, the base station determines whether a clear channel has been detected for downlink transmissions. For example, the base station may determine that a clear channel has been detected if the measurement report from the user equipment indicates that one of the channels has a measured received energy or RSSI that is below a threshold. If a clear channel has been detected, the base station may transmit downlink signals on the clear channel at block 415. If the base station does not detect a clear channel based on the measurement report received from the user equipment, then the base station may have to share one of the channels in the unlicensed frequency band with one or more other nodes. The other nodes may or may not operate according to the same RAT. For example, the node may operate according to a first RAT such as LTE and the other nodes may operate according to the first RAT or a second RAT such as Wi-Fi.

If the base station selects a shared channel for downlink transmissions, then the base station may negotiate (at block 420) with the other base stations using the shared channel for time division multiplexing (TDM) intervals in portions of a repeating gating cycle. If the base station determines (using the reports from the user equipment) that the other base stations are transmitting over the shared channel according to the first RAT and none of the other base stations are transmitting according to a different (second) RAT, the base station may negotiate for time intervals that may span the entire gating cycle. If the base station determines that one or more of the other base stations are transmitting according to a different (second) RAT, the base station may reserve a predetermined time interval in the gating cycle for downlink transmission according to the second RAT. The base station may bypass transmission during the reserved predetermined time interval in the gating cycle. The base stations that operate according to the first RAT may then negotiate TDM time intervals in the unreserved portion of the gating cycle. At block 425, the base stations may transmit downlink signals over the shared channel of the unlicensed frequency band during the negotiated TDM time intervals.

Figure 5:
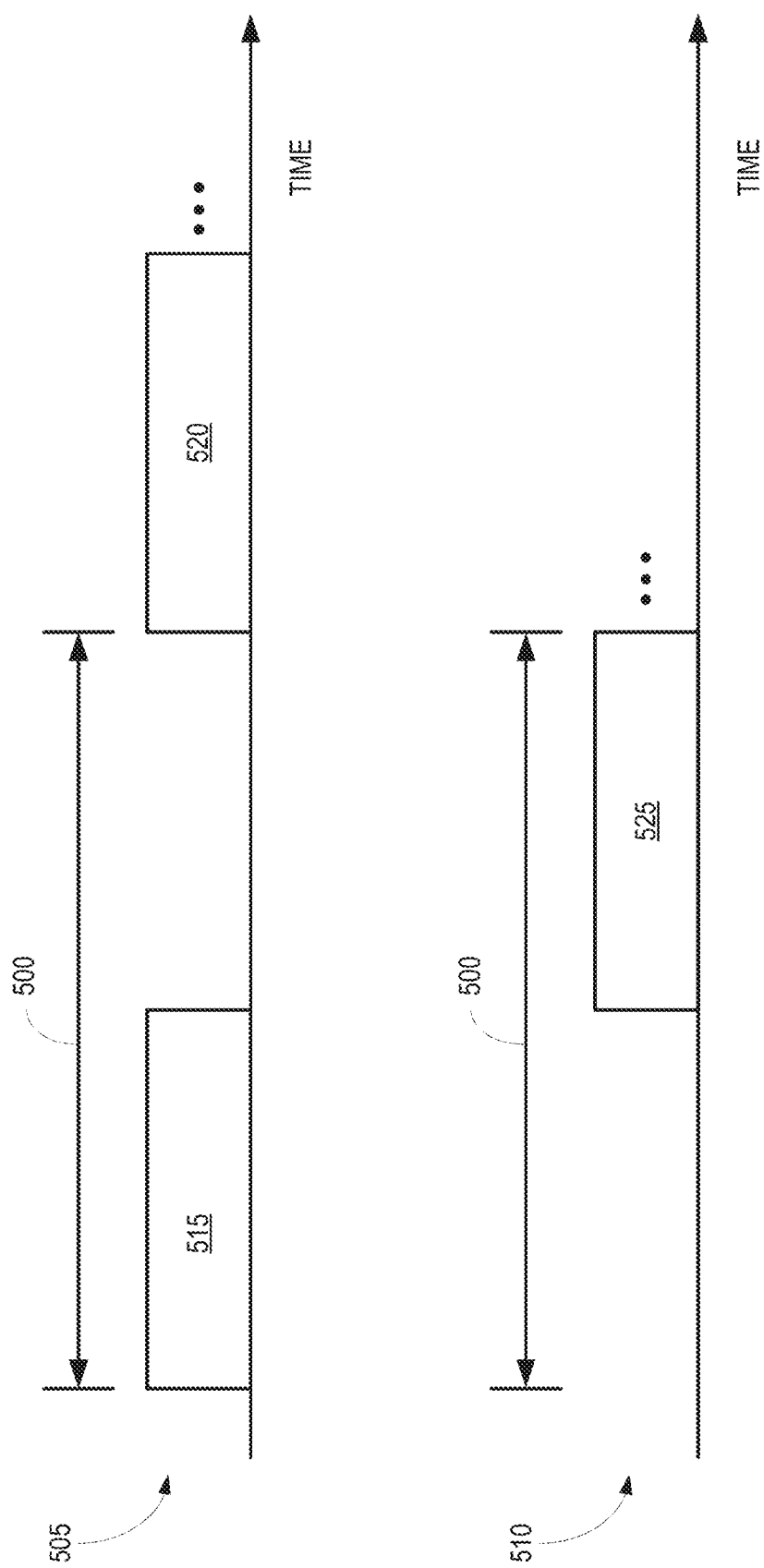
FIG. 5 is a diagram showing allocation of time intervals in a gating cycle for downlink transmissions by two base stations on a channel of an unlicensed frequency band according to some embodiments.

FIG. 5 is a diagram showing allocation of time intervals in a gating cycle 500 for downlink transmissions by two base stations on a channel of an unlicensed frequency band according to some embodiments. The gating cycle 500 may repeat indefinitely or for a predetermined amount of time. A first allocation 505 indicates time intervals in the gating cycle 500 that are allocated to a first base station (such as the base station 104 shown in FIG. 1) and a second allocation 510 indicates time intervals in the gating cycle 500 that are allocated to a second base station (such as a base station 105 shown in FIG. 1). The horizontal axes indicate time increasing from left to right. The first and second base stations operate according to the same radio access technology (RAT) and so they can share the entire gating cycle 500. For example, the first and second base stations may transmit downlink signals on the channel of the unlicensed frequency band according to LTE.

The time interval 515 in the gating cycle 500, as well as the time interval 520 in the subsequent gating cycle in a series of repeating gating cycles, maybe allocated to the first base station for downlink transmissions on the channel of the unlicensed frequency band. The time interval 525 in the gating cycle 500 may be allocated to the second base station for downlink transmissions on the channel of the unlicensed frequency band. Consequently, downlink transmissions by the first and second base stations may not interfere with each other during the gating cycle 500. As discussed herein, the second base stations may select the time interval 525 in response to determining that the first base station is already transmitting on the channel. Some embodiments of the first and second base stations may negotiate for the time intervals 515, 520, 525 by exchanging messages over an interface such as the interface 120 shown in FIG. 1.

Figure 6:
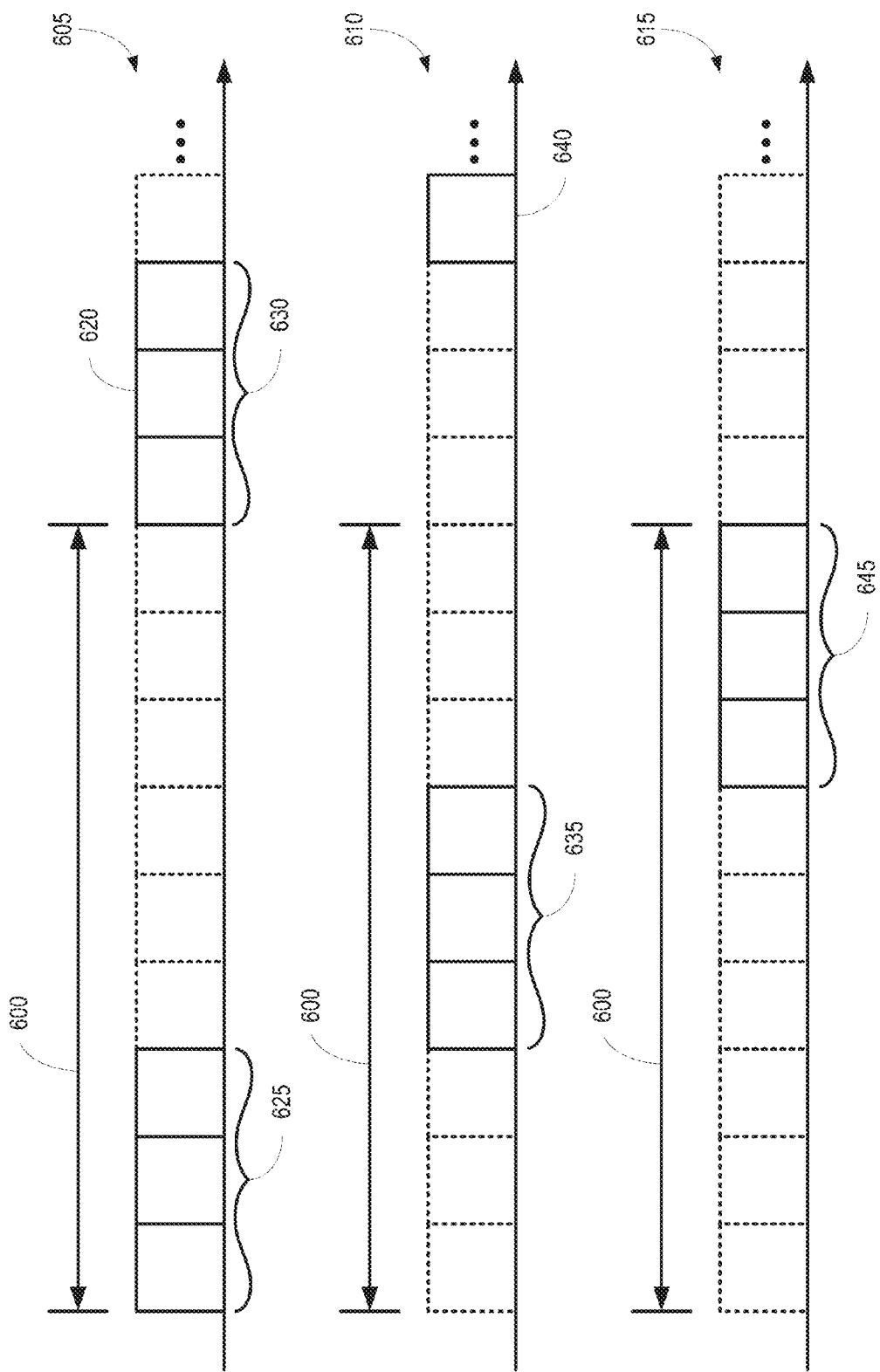
FIG. 6 is a diagram showing allocation of time intervals in a gating cycle for downlink transmissions by three base stations on a channel of an unlicensed frequency band according to some embodiments.

FIG. 6 is a diagram showing allocation of time intervals in a gating cycle 600 for downlink transmissions by three base stations on a channel of an unlicensed frequency band according to some embodiments. The gating cycle 600 may repeat indefinitely or for a predetermined amount of time. A first allocation 605 indicates time intervals in the gating cycle 600 that are allocated to a first base station (such as the base station 104 shown in FIG. 1), a second allocation 610 indicates time intervals in the gating cycle 600 that are allocated to a second base station (such as the base station 105 shown in FIG. 1), and a third allocation 615 indicates time intervals in the gating cycle 600 that are allocated to a third base station. The horizontal axes indicate time increasing from left to right. The first, second, and third base stations operate according to the same RAT and so they can share the entire gating cycle 600. For example, the first, second, and third base stations may transmit downlink signals on the channel of the unlicensed frequency band according to LTE.

The gating cycle 600 is subdivided into time slots 620 (only one indicated by a reference numeral in the interest of clarity) that can be allocated to the first, second, or third base stations for downlink transmissions on the channel of the unlicensed frequency band. The first, second, and third base stations may therefore negotiate to partition the timeslot 620 among themselves, e.g., by exchanging information over interfaces between the first, second, and third base stations. The negotiation protocol is a matter of design choice. In the illustrated embodiment, the first, second, and third base stations have negotiated to allocate a subset 625 of the timeslots in the gating cycle 600, as well as a subset 630 of the timeslots in the subsequent gating cycle, to the first base station. The dotted lines indicate time slots that are not allocated to the first base station. As a result of the negotiations, the subset 635 in the gating cycle 600, as well as the timeslot 640 in the subsequent gating cycle, are allocated to the second base station and the subset 645 is allocated to the third base station.

Figure 7:
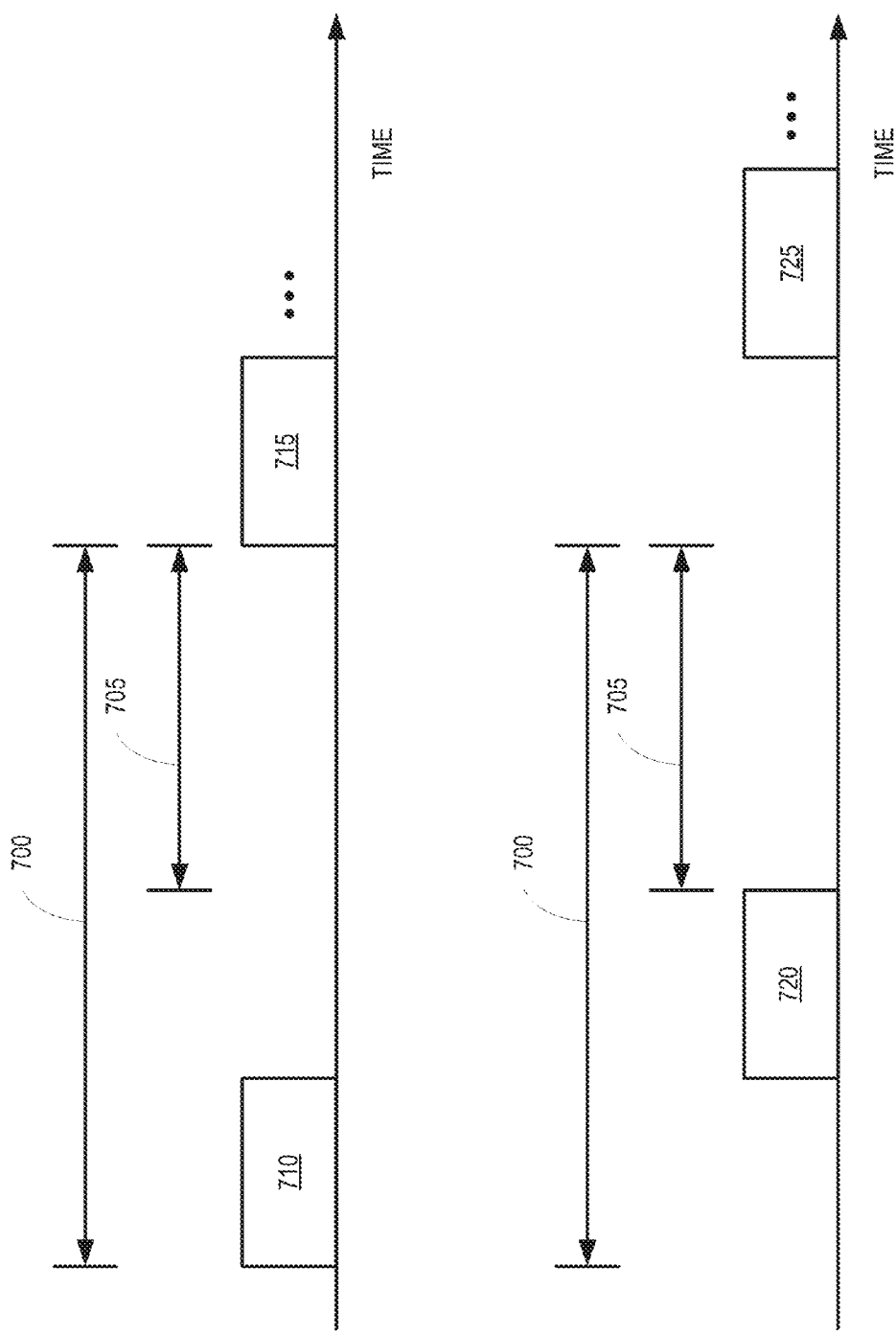
FIG. 7 is a diagram showing allocation of time intervals in a gating cycle for downlink transmissions by two base stations that operate according to a first RAT and a third base station that operates according to a second RAT according to some embodiments.

FIG. 7 is a diagram showing allocation of time intervals in a gating cycle 700 for downlink transmissions by two base stations that operate according to a first RAT and a third base station that operates according to a second RAT according to some embodiments. The gating cycle 700 may repeat indefinitely or for a predetermined amount of time. First and second base stations that operate according to a first RAT have detected the presence of a third base station that operates according to a second RAT. For example, the first and second base stations may operate according to LTE and the third base station may operate according to Wi-Fi. The third base station is transmitting downlink signals over a shared channel of an unlicensed frequency band. The first and second base stations therefore reserve a predetermined time interval 705 for downlink transmissions by the third base station. For example, the predetermined time interval 705 may correspond to a 50% duty cycle. The first and second base stations bypass downlink transmissions on the shared channel during the predetermined time interval 705.

The first and second base stations negotiate allocation of the unreserved portion of the gating cycle 700, e.g., using messages transmitted over an interface between the first and second base stations. As a result of the negotiation, the first base station is allocated a time interval 710 in unreserved portion of the gating cycle 700, as well as the time interval 715 in an unreserved portion of the subsequent gating cycle, for downlink transmissions over the shared channel of the unlicensed frequency band. The second base station is allocated a time interval 720 in the unreserved portion of the gating cycle 700, as well as the time interval 725 in an unreserved portion of the subsequent gating cycle, for downlink transmission over the shared channel. In some embodiments, the time intervals 710, 715, 720, 725 may include one or more timeslots such as the time slots 620 shown in FIG. 6. Timeslots in the unreserved portion of the gating cycle 700 may therefore be allocated to more than two base stations that share the channel of the unlicensed frequency band and operate according to the first RAT.

Figure 8:
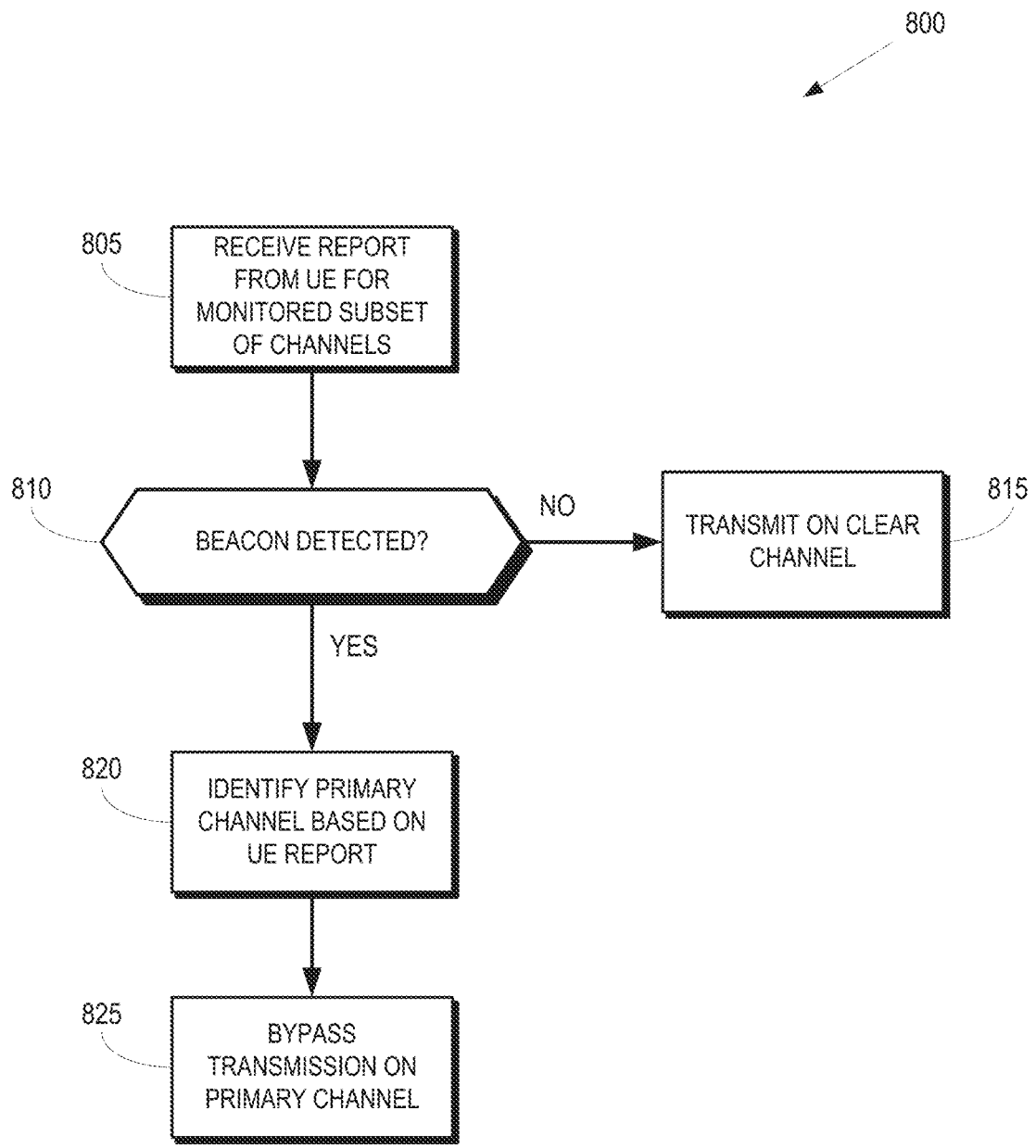
FIG. 8 is a flow diagram of a method for identifying and bypassing transmission over a primary channel of an unlicensed frequency band according to some embodiments.

FIG. 8 is a flow diagram of a method 800 for identifying and bypassing transmission over a primary channel of an unlicensed frequency band according to some embodiments. The method 800 may be implemented in some embodiments of the base stations 104, 105 shown in FIG. 1 and some embodiments of the base station 205 shown in FIG. 2. At block 805, the base station receives a report from one or more user equipment for a monitored subset of channels. In the illustrated embodiment, the base station receives one or more messages including the report, which may include information such as a measured RSSI, SNR, or SINR of one or more of the channels. The one or more messages also include information indicating whether one or more of the channels is a primary channel or a secondary channel used by a base station that operates according to a RAT such as Wi-Fi or other IEEE 802.11 standards. As discussed herein, user equipment may determine whether one or more of the channels is a primary channel or a secondary channel using information (such as a beacon signal preamble) in the modulated or decoded signals received by the user equipment over the channel during a measurement gap.

At decision block 810, the base station uses information in the measurement report to determine whether the user equipment detected a beacon signal transmitted on a primary channel. Some embodiments of a beacon signal may convey system information to user equipment that user equipment need to maintain their association with the base station or access point that transmitted the beacon signal. The base stations should not select the primary channel for downlink transmissions because user equipment may not be able to successfully receive (i.e., demodulate and decode) the primary channel if there is interference from downlink transmissions on the primary channel by the base station. Thus, if the measurement report indicates that no beacon signals or primary channels were detected by the user equipment, the base station may transmit (at block 815) on a clear channel from the subset of channels. However, if the measurement report indicates that the user equipment detected a beacon signal or a primary channel, the base station may identify the primary channel using the information in the measurement report at block 820. The base station may then bypass transmission on the primary channel at block 825. Bypassing transmission on the primary channel may include selecting a different channel from the subset of channels and transmitting on the selected channel or it may include bypassing transmission altogether until a clear, non-primary channel has been detected.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    measuring, at a first base station, values of received energy on each of a plurality of channels of an unlicensed frequency band;
    selecting, at the first base station, a subset of the channels based on the measured values; and
    transmitting, from the first base station, at least one message instructing user equipment to monitor the subset of channels, wherein the user equipment reports information indicating whether at least one second base station is transmitting over the subset of channels in response to the requested monitoring of the subset of channels.

2. The method of claim 1, wherein selecting the subset of channels further comprises:
    ranking the channels so that higher ranked channels correspond to lower measured values of received energy and lower ranked channels correspond to higher measured values of received energy: and
    selecting a predetermined number of higher ranked channels.

3. The method of claim 1, wherein transmitting the at least one message comprises transmitting configuration information for a measurement gap for the user equipment to monitor the subset of channels.

4. The method of claim 1, further comprising:
    receiving information indicating whether the at least one second base station is transmitting over at least one of the subset of channels; and transmitting downlink signals over a downlink channel selected from the subset of channels based on the received information.

5. The method of claim 4, wherein receiving the information comprises receiving information identifying a primary channel that conveys a beacon signal from the at least one second base station, and wherein transmitting the downlink signals comprises bypassing transmission of downlink signals over the primary channel.

6. The method of claim 4, wherein receiving the information comprises receiving information indicating that the at least one second base station is transmitting over the subset of channels, and further comprising:
negotiating time-sharing of the downlink channel with the at least one second base station.

7. A method comprising:
monitoring, at user equipment, a subset of a plurality of channels of an unlicensed frequency band in response to receiving at least one message from a first base station indicating the subset of channels, wherein the first base station selects the subset based on measured values of energy received by the first base station on each of the plurality of channels; and
transmitting, from the user equipment, at least one message including information indicating whether at least one second base station is transmitting over the subset of channels.

8. The method of claim 7, wherein monitoring the subset of channels comprises monitoring the subset of channels during a measurement gap indicated by the at least one message received from the first base station.

9. The method of claim 8, wherein monitoring the subset of channels comprises measuring received signal strengths on the subset of channels.

10. The method of claim 9, wherein monitoring the subset of channels comprises identifying a primary channel in the subset of channels, wherein the at least one second base station uses the primary channel to transmit a beacon signal.

11. The method of claim 10, wherein transmitting the at least one message comprises transmitting at least one message including information indicating at least one of the measured received signal strengths and the primary channel.

12. A base station comprising:
a transceiver to measure values of received energy on each of a plurality of channels of an unlicensed frequency band; and
a processor to select a subset of the channels based on the measured values, and wherein the transceiver is to transmit at least one message instructing user equipment to monitor the subset of channels, wherein the transceiver is to receive information reported by the user equipment in response to monitoring the subset of channels, and wherein the reported information indicates whether at least one other base station is transmitting over the subset of channels.

13. The base station of claim 12, wherein the processor is to rank the channels so that higher ranked channels correspond to lower measured values of received energy and lower ranked channels correspond to higher measured values of received energy, and wherein the processor is to select a predetermined number of higher ranked channels to be in the subset of channels.

14. The base station of claim 12, wherein the transceiver is to transmit configuration information for a measurement gap for the user equipment to monitor the subset of channels.

15. The base station of claim 12, wherein the transceiver is to receive information indicating whether the at least one other base station is transmitting over at least one of the subset of channels, and wherein the transceiver is to transmit downlink signals over a downlink channel selected from the subset of channels based on the received information.

16. The base station of claim 15, wherein the transceiver is to receive information identifying a primary channel that conveys a beacon signal from the at least one other base station, and wherein the transceiver is to bypass transmission of downlink signals over the primary channel.

17. The base station of claim 15, wherein the transceiver is to receive information indicating that the at least one other base station is transmitting over the subset of channels, and wherein the processor is to negotiate time-sharing of the downlink channel with the at least one other base station.

18. User equipment comprising:
a processor to monitor a subset of a plurality of channels of an unlicensed frequency band in response to receiving at least one message from a first base station indicating the subset of channels, wherein the first base station selects the subset based on measured values of energy received by the first base station on each of the plurality of channels; and
a transceiver to transmit at least one message including information indicating whether at least one second base station is transmitting over the subset of channels.

19. The user equipment of claim 18, wherein the processor is to monitor the subset of channels during a measurement gap indicated by the at least one message received from the first base station.

20. The user equipment of claim 19, wherein the processor is to measure signal strengths received by the transceiver on the subset of channels.

21. The user equipment of claim 20, wherein the processor is to identify a primary channel in the subset of channels, wherein the at least one second base station uses the primary channel to transmit a beacon signal.

22. The user equipment of claim 21, wherein the transceiver is to transmit at least one message including information indicating at least one of the measured received signal strengths and the primary channel.

* * * * *